(12) United States Patent
Tashiro (10) Patent No.: US 10,970,581 B2
(45) Date of Patent: Apr. 6, 2021

(54) ELECTRONIC DEVICE

(71) Applicant: KYOCERA Document Solutions Inc., Osaka (JP)

(72) Inventor: Daigo Tashiro, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 85 days.

(21) Appl. No.: 16/424,626

(22) Filed: May 29, 2019

(65) Prior Publication Data
US 2019/0370595 A1    Dec. 5, 2019

(30) Foreign Application Priority Data
May 30, 2018  (JP) .............................. JP2018-103704

(51) Int. Cl.
G06K 9/34    (2006.01)
G06F 16/957    (2019.01)
H04N 1/56    (2006.01)
H04N 1/00    (2006.01)

(52) U.S. Cl.
CPC ......... *G06K 9/344* (2013.01); *G06F 16/9574* (2019.01); *H04N 1/00798* (2013.01); *H04N 1/56* (2013.01)

(58) Field of Classification Search
None
See application file for complete search history.

(56) References Cited

U.S. PATENT DOCUMENTS

| 2007/0263930 | A1* | 11/2007 | Ito | G06K 9/38 |
| | | | | 382/177 |
| 2014/0085669 | A1* | 3/2014 | Kashimoto | G06K 9/00469 |
| | | | | 358/1.15 |
| 2014/0294302 | A1* | 10/2014 | King | G06K 9/344 |
| | | | | 382/177 |
| 2016/0103915 | A1* | 4/2016 | Yoo | G06F 16/5846 |
| | | | | 715/206 |
| 2016/0179833 | A1* | 6/2016 | Lin | G06F 40/134 |
| | | | | 707/722 |

FOREIGN PATENT DOCUMENTS

JP    2009-211278 A    9/2009

* cited by examiner

*Primary Examiner* — Leon Viet Q Nguyen
(74) *Attorney, Agent, or Firm* — Studebaker & Brackett PC (57) ABSTRACT

An image forming apparatus includes an image reading unit, an extraction section, a character recognition section, a search section, an attachment section, and file storage. The image reading unit generates first image information. The extraction section extracts a specific area from the image base on the first image information. The character recognition section generates text information corresponding to information of a character string image included in the specific area. The search section searches for a webpage containing information relating to a meaning of a text indicated by the text information. The attachment section attaches link information of the webpage to the information of the character string image to generate second image information. The file storage section stores the second image information as a file therein. The specific area is an area with a specific mark applied thereto.

8 Claims, 11 Drawing Sheets

FIG. 11

ELECTRONIC DEVICE

INCORPORATION BY REFERENCE

The present application claims priority under 35 U.S.C. § 119 to Japanese Patent Application No. 2018-103704, filed on May 30, 2018. The contents of this application are incorporated herein by reference in their entirety.

BACKGROUND

The present disclosure relates to an electronic device.

A search system includes a mobile terminal and a server device. When a search key of the mobile terminal is pressed, the mobile terminal transmits displayed text information to the server device. The server device includes a data base. Upon receiving the text information from the mobile terminal, the server device detects a character string included in the data base from text indicated by the text information. The server device then performs an embedding process (linking) of embedding, in the detected character string, URL information of information related to the character string. The text information subjected to the embedding process is transmitted to the mobile terminal. A webpage of the information related to the character string can be displayed through a user selecting the character string subjected to the embedding process.

SUMMARY

An electronic device according to an aspect of the present disclosure includes a reading section, an extraction section, a recognition section, a search section, an attachment section, and file storage. The reading section reads an image formed on a document to generate first image information. The extraction section extracts a specific area from the image base on the first image information. The recognition section performs character recognition processing on information of a character string image included in the specific area to generate text information corresponding to the information of the character string image. The search section searches for a webpage containing information relating to a meaning of a text indicated by the text information. The attachment section attaches link information of the webpage to the information of the character string image to generate second image information. The storage stores the second image information therein. The specific area is an area with a specific mark applied thereto.

DETAILED DESCRIPTION

The following describes an embodiment of the present disclosure with reference to the accompanying drawings (FIGS. 1 to 11). It should be noted that elements in the drawings that are the same or equivalent are labelled using the same reference signs and description thereof is not repeated.

Figure 1:
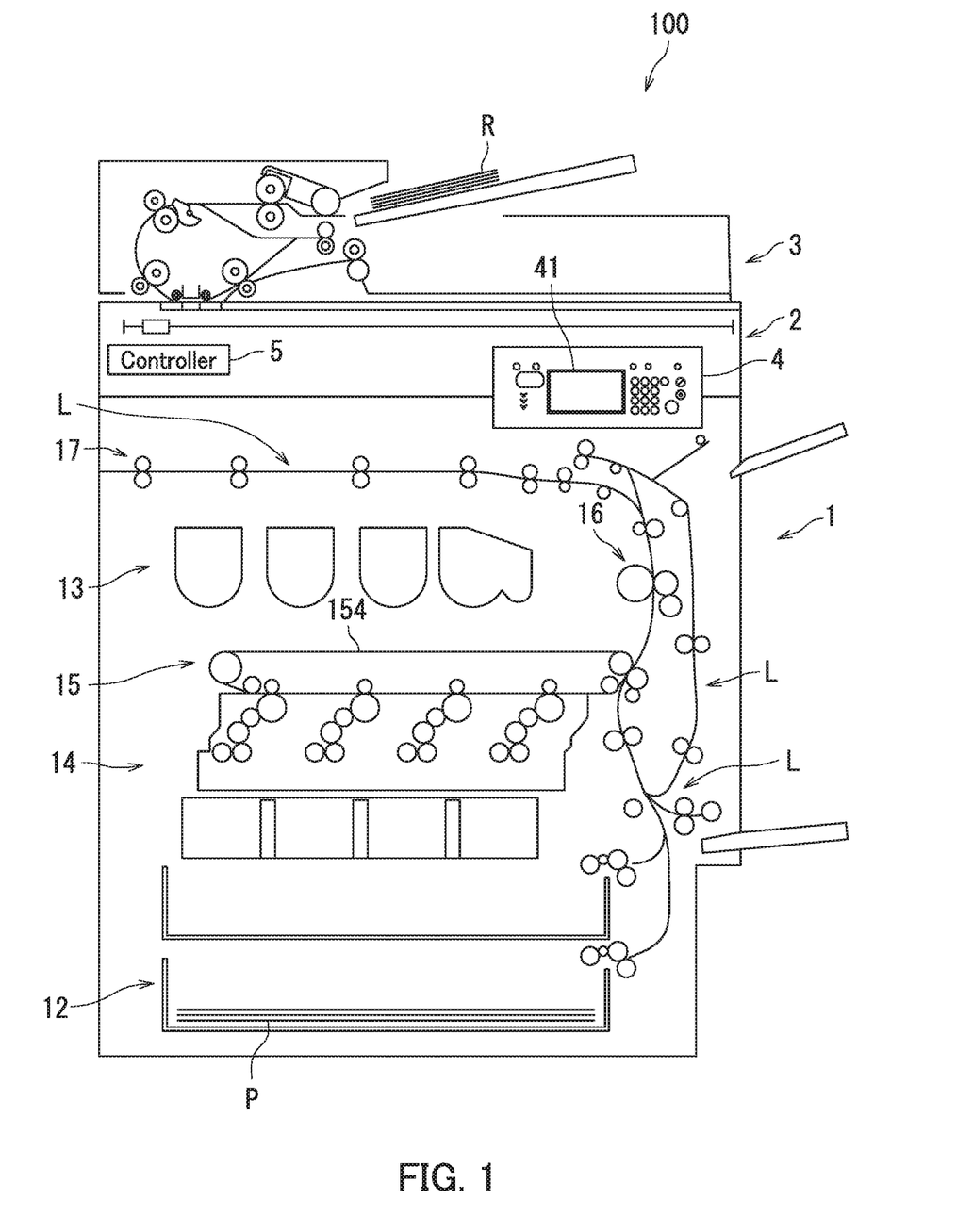
FIG. 1 is a diagram illustrating an example of a configuration of an image forming apparatus according to an embodiment of the present disclosure.

A configuration of an image forming apparatus 100 according to the embodiment of the present disclosure will be described first with reference to FIG. 1. FIG. 1 is a diagram illustrating the configuration of the image forming apparatus 100. The image forming apparatus 100 is a color multifunction peripheral. The image forming apparatus 100 is equivalent to an example of an "electronic device".

As illustrated in FIG. 1, the image forming apparatus 100 includes an image forming unit 1, an image reading unit 2, a document conveyance unit 3, an operation display section 4, and a controller 5. The image forming unit 1 forms an image on a sheet P. The image reading unit 2 reads an image from a document R to generate image information. The document conveyance unit 3 conveys the document R to the image reading unit 2. The operation display section 4 receives user operation. The controller 5 controls operation of the image forming apparatus 100. The image reading unit 2 is equivalent to an example of a "reading section".

The image forming unit 1 includes a feeding section 12, a conveyance section L, a toner supply section 13, an image forming section 14, a fixing section 16, and an ejection section 17. The image forming section 14 includes a transfer section 15.

The feeding section 12 feeds a sheet P to the conveyance section L. The conveyance section L conveys the sheet P to the ejection section 17 via the transfer section 15 and the fixing section 16.

A toner container is attached to the toner supply section 13. The toner supply section 13 supplies toner to the image forming section 14. The image forming section 14 forms an image on the sheet P.

The transfer section 15 includes an intermediate transfer belt 154. The image forming section 14 transfers toner images in a cyan color, a magenta color, a yellow color, and a block color onto the intermediate transfer belt 154. The toner images in the different colors are superimposed on the intermediate transfer belt 154, thereby forming an image on the intermediate transfer belt 154. The transfer section 15 transfers the image formed on the intermediate transfer belt 154 to the sheet P. As a result, the image is formed on the sheet P.

The fixing section 16 applies heat and pressure to the sheet P to fix the image formed on the sheet P to the sheet P. The ejection section 17 ejects the sheet P out of the image forming apparatus 100.

The operation display section 4 includes a touch panel 41. The touch panel 41 includes for example a liquid crystal display (LCD) to display various images. The touch panel 41 further includes a touch sensor to receive user operation.

The controller 5 includes a processor and storage. The processor includes for example a central processing unit (CPU). The storage includes memory such as semiconductor memory and may include a hard disk drive (HDD). The storage stores a control program therein.

Figure 2:
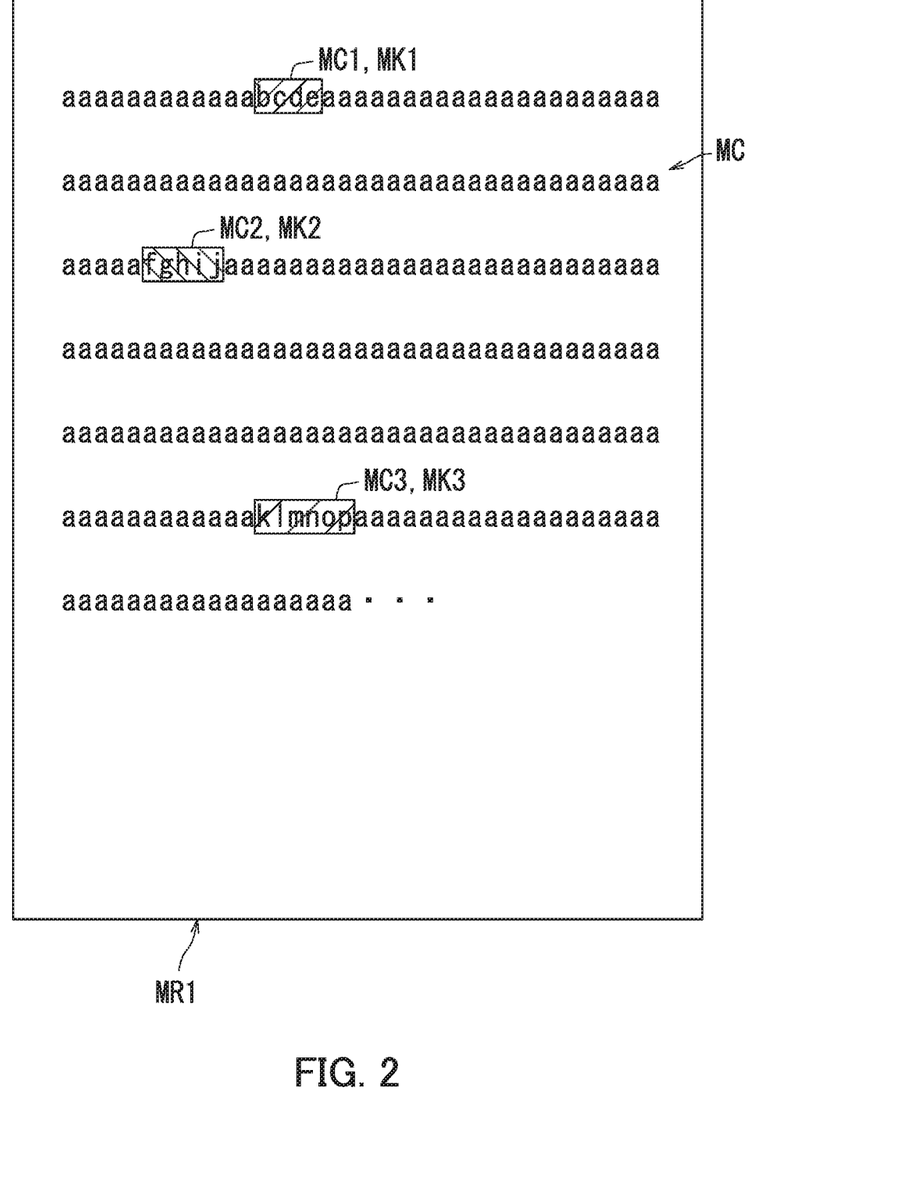
FIG. 2 is a diagram illustrating an example of a first image formed on a document in the embodiment of the present disclosure.

The following describes a first image MR1 formed on the document R in the embodiment of the present disclosure with reference to FIGS. 1 and 2. FIG. 2 is a diagram illustrating an example of the first image MR1 formed on the document R. As illustrated in FIG. 2, the first image MR1 includes character string images MC, a first specific area MK1, a second specific area MK2, and a third specific area MK3. The character string images MC include a first character string image MC1, a second character string image MC2, and a third character string image MC3. Each of the first to third specific areas MK1 to MK3 is equivalent to an example of a "specific area".

The first character string image MC1 is an image of a first character string CP1. The first character string CP1 is a character string representing "bcde". The first character string image MC1 is located in the first specific area MK1. The first specific area MK1 is an area with a marker ink applied thereto. Specifically, the first specific area MK1 is an area with a red marker ink applied thereto.

The second character string image MC2 is an image of a second character string CP2. The second character string CP2 is a character string representing "fghij". The second character string image MC2 is located in the second specific area MK2. The second specific area MK2 is an area with a maker ink applied thereto. Specifically, the second specific area MK2 is an area with a yellow marker ink applied thereto.

The third character string image MC3 is an image of a third character string CP3. The third character string CP3 is a character string representing "klmnop". The third character string image MC3 is located in the third specific area MK3. The third specific area MK3 is an area with a marker ink applied thereto. Specifically, the third specific area MK3 is an area with the red marker ink applied thereto.

FIG. 2 indicates that the red ink is applied to the first specific area MK1 and the third specific area MK3 through hatching on the first specific area MK1 and the third specific area MK3 in the same hatching manner. FIG. 2 also indicates that the yellow ink is applied to the second specific area MK2 through hatching on the second specific area MK2 in a manner different from the manner for the first specific area MK1.

Figure 3:
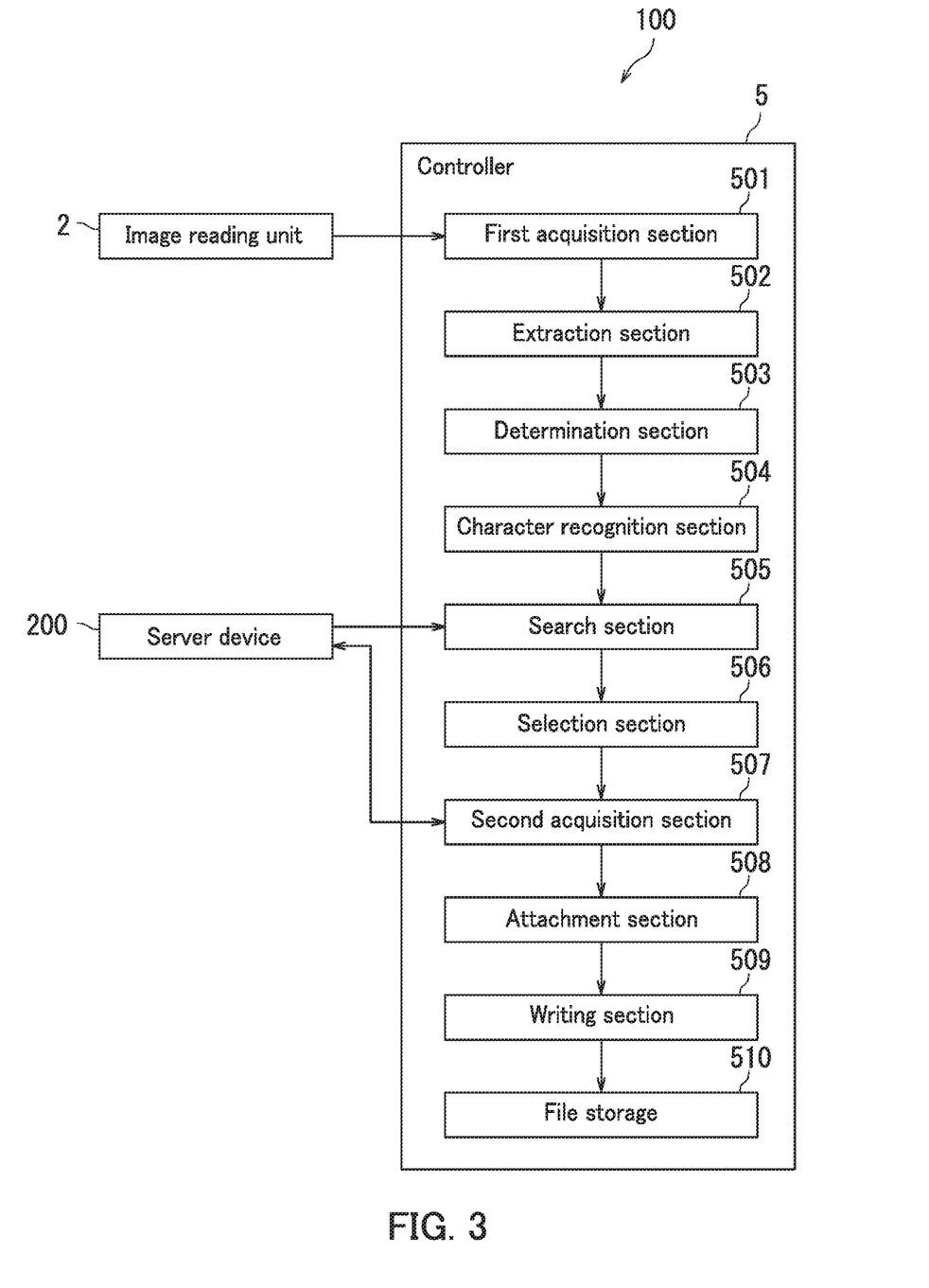
FIG. 3 is a block diagram illustrating an example of a configuration of a controller according to the embodiment of the present disclosure.

The following describes a configuration of the controller 5 according to the embodiment of the present disclosure with reference to FIGS. 1 to 3. FIG. 3 is a diagram illustrating an example of the configuration of the controller 5. As illustrated in FIG. 3, the controller 5 includes a first acquisition section 501, an extraction section 502, a determination section 503, a character recognition section 504, a search section 505, a selection section 506, a second acquisition section 507, an attachment section 508, a writing section 509, and file storage 510. Specifically, the processor of the controller 5 executes the control program to function as the first acquisition section 501, the extraction section 502, the determination section 503, the character recognition section 504, the search section 505, the selection section 506, the second acquisition section 507, the attachment section 508, and the writing section 509. The processor of the controller 5 also executes the control program to cause the storage to function as the file storage 510.

The file storage 510 stores therein second image information MRJ2 as a file. For example, the file storage 510 stores therein the second image information MRJ2 as a file in portable document format (PDF) format. The second image information MRJ2 indicates a second image MR2. The second image MR2 will be described later in detail with reference to FIG. 4. The file storage 510 is equivalent to an example of "storage".

The first acquisition section 501 acquires first image information MRJ1 from the image reading unit 2. Specifically, the image reading unit 2 reads the first image MR1 formed on the document R to generate the first image information MRJ1. The first acquisition section 501 acquires the first image information MRJ1 generated by the image reading unit 2.

The extraction section 502 extracts specific areas MK from the first image MR1 based on the first image information MRJ1. The specific areas MK each are an area of the first image MR1 where a specific mark is provided. In the embodiment of the present disclosure, the specific mark is a mark with a marker ink applied thereto. The specific areas MK each are an area with the marker ink applied thereto.

The determination section 503 determines an ink color CL of each specific area MK.

The specific mark is a mark with the marker ink applied thereto in the embodiment of the present disclosure, which should not be taken to limit the present disclosure. The specific mark may be a mark as a color image formed by an electronic marker. In such a case, each specific area MK is an area of the color image formed by the electronic marker. Furthermore, the determination section 503 determines a color CL of the color image of the specific area MK. The "electronic marker" refers to a marker used to paint the first image MR1 corresponding to the first image information MRJ1 by application software (for example, "Adobe Acrobat" (product name)) to form a semitransparent color image.

Note that the color image by the electronic marker is painted on the first image MR1 corresponding to the first image information MRJ1. The extraction section 502 extracts the specific areas MK from the first image MR1 with the color image by the electronic marker painted thereon. The first image MR1 is an image indicating the first image information MRJ1 with the color image by the electronic marker painted thereon.

The character recognition section 504 performs character recognition processing on character string image information MCJ included in each specific area MK to generate text information TXJ corresponding to the character string image information MCJ. The character string image information MCJ indicates the character string images MC. The character string images MC are images of character strings CR. The text information TXJ indicates texts TX. The character recognition section 504 is equivalent to an example of a "recognition section".

The character string images MC include the first character string image MC1, the second character string image MC2, and the third character string image MC3 in the embodiment of the present disclosure as illustrated in FIG. 2. The first character string image MC1 is an image of a first character string CP1. The second character string image MC2 is an image of a second character string CP2. The third character string image MC3 is an image of a third character string CP3. The texts TX include a first text TX1, a second text TX2, and a third text TX3. The first text TX1 corresponds to the first character string CP1. The second text TX2 corresponds to the second character string CP2. The third text TX3 corresponds to the third character string CP3. Note that the character string images MC each are an image of a handwritten character string in the embodiment of the present disclosure. The character string image information MCJ is equivalent to an example of "information of a character string image". The first character string image information MCJ1 indicates the first character string image MC1. The second character string image information MCJ2 indicates the second character string image MC2. The third character string image information MCJ3 indicates the third character string image MC3.

The search section 505 searches for a webpage WP including information relating to a meaning of each text TX indicated by the text information TXJ. As illustrated in FIG. 3, the image forming apparatus 100 is connected to the server device 200 in a communicable manner in the embodiment of the present disclosure.

The server device 200 is capable of performing a search process of searching a first search site ST1 for a webpage WP and a search process of searching a second search site ST2 for the webpage WP. The server device 200 is connected to the Internet and includes a web browser. The search process in the first search site ST1 is performed using a search engine such as "YAHOO! (registered Japanese trademark)". The search process in the second search site ST2 is performed using another search engine such as "Google (registered Japanese trademark)".

The search section 505 searches for a first specific number NP1 of webpages WP according to a result of determination by the determination section 503. Specifically, the search section 505 determines a single search site STA from among a plurality of search sites STN according to the result of determination by the determination section 503, and searches the single search site STA for the first specific number NP1 of webpages WP. The search sites STN include for example the first search site ST1 and the second search site ST2. In a situation in which the ink color CL of a specific area MK is red, the search section 505 searches the first search site ST1 for the first specific number NP1 of webpages WP. In a situation in which the ink color CL of a specific area MK is yellow, the search section 505 searches the second search site ST2 for the first specific number NP1 of webpages WP. The first specific number NP1 is 1 in the embodiment of the present disclosure.

The selection section 506 selects the first specific number NP1 of webpages WP. The selection section 506 will be described later in detail with reference to FIG. 10.

The second acquisition section 507 acquires webpage information WPJ. The webpage information WPJ indicates the first specific number NP1 of webpages WP. Specifically, the second acquisition section 507 acquires the webpage information WPJ by downloading the webpage information WPJ through the server device 200. The second acquisition section 507 is equivalent to an example of an "acquisition section".

The attachment section 508 attaches, as a reference, link information LNJ of each webpage WP to the character string image information MCJ to generate second image information MRJ2.

The writing section 509 writes the second image information MRJ2 as a file into the storage 510.

As described with reference to FIGS. 1 to 3, the search section 505 searches for the webpages WP including information relating to meanings of the character strings CP included in the respective specific areas MK in the embodiment of the present disclosure. The attachment section 508 attaches, as a reference, the link information LNJ of each webpage WP to the character string image information MCJ.

Thus, in a situation in which a character string CP on which the user desires to perform search is included in a specific area MK, a webpage WP relating to a meaning of the character string CP can be displayed by the user selecting a character string image MC with the link information LNJ attached thereto. Thus, user convenience for search can be increased.

The specific areas MK each are an area with a marker ink painted thereon or an area of a color image by an electronic marker formed therein. The above configuration enables the user to easily specify the specific area MK. Thus, user convenience can be further increased.

Each of the specific areas MK includes a handwritten character string CP, and the search section 505 searches for the webpage WP including information relating to the meaning of the character string CP included in the specific area MK. The attachment section 508 attaches, as a reference, the link information LNJ of the webpage WP to the character string image information MCJ. In the above configuration, selection of a character string image MC with the link information LNJ attached thereto can cause display of the webpage WP relating to the meaning of a corresponding character string CP even in a situation for example in Which the specific mark is applied in a handwritten notebook. Thus, user convenience for search can be further increased.

An example in which the character strings CP included in the specific areas MK are handwritten character strings CP is described in the embodiment of the present disclosure, which should not be taken to limit the present disclosure. Any of the character strings CP included in the specific areas MK may be a character string in a character font. In the above case, the character recognition processing by the character recognition section 504 can be facilitated.

Figure 4:
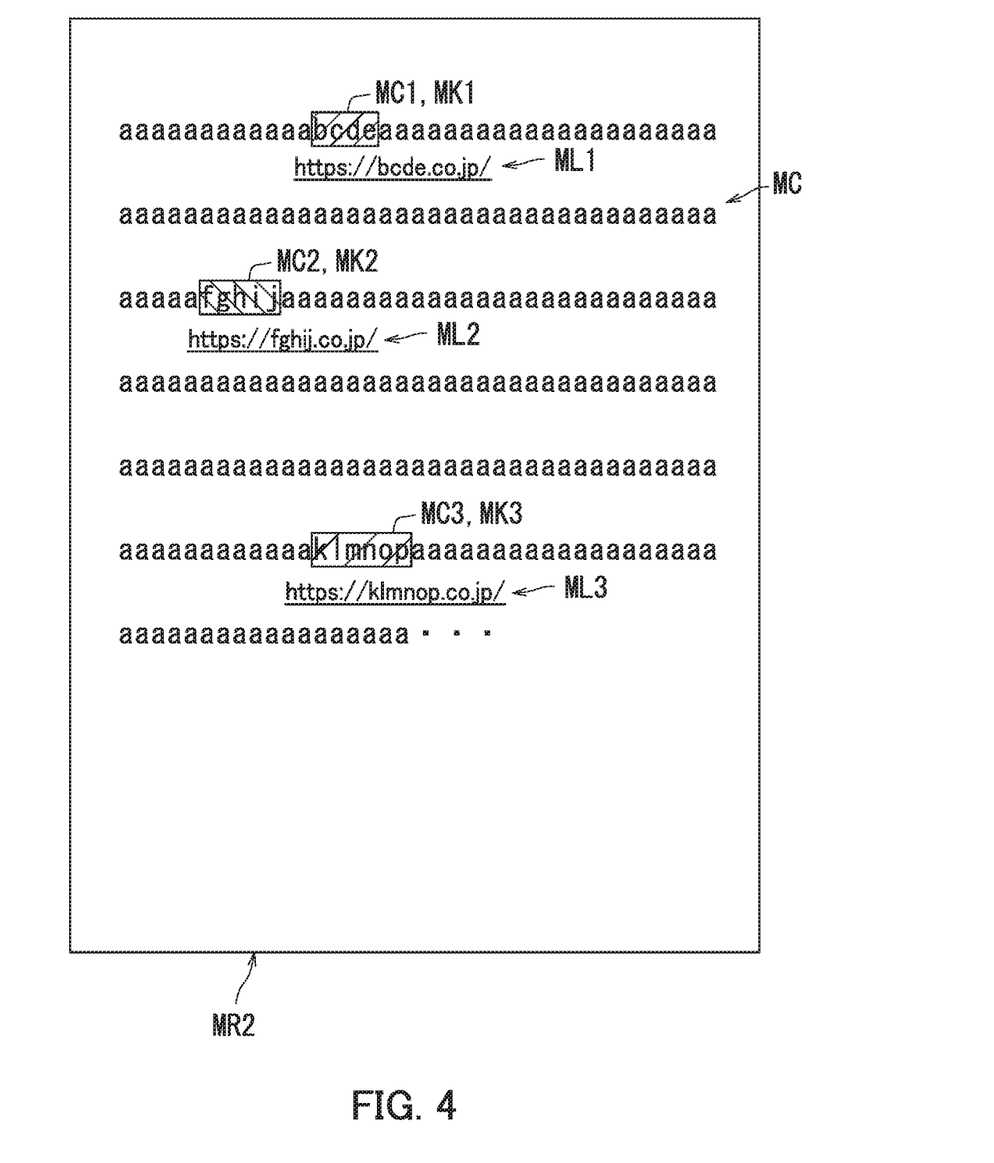
FIG. 4 is a diagram illustrating a diagram illustrating an example of a second image.

The following describes the second image MR2 with reference to FIGS. 2 to 4. FIG. 4 is a diagram illustrating an example of the second image MR2.

As illustrated in FIG. 4, the second image MR2 includes character string images MC, a first specific area MK1, a second specific area MK2, a third specific area MK3, and link images ML. The link images ML include a first link image ML1, a second link image ML2, and a third link image ML3. The character string images MC include a first character string image MC1, a second character string image MC2, and a third character string image MC3. The second image MR2 illustrated in FIG. 4 differs from the first image MR1 illustrated in FIG. 2 in inclusion of the first link image ML1, the second link image ML2, and the third link image ML3. In the following description, the difference from the first image MR1 illustrated in FIG. 2 will be mainly discussed and description of the same configuration as that of the first image MR1 is omitted.

The first link image ML1 indicates first link information LNJ1 of a first webpage WP1. The first link image ML1 is attached to the first character string image MC1 as a reference by the attachment section 508. The first link image ML1 is located for example beneath the first character string image MC1. The first webpage WP1 includes information relating to a meaning of the first character string CP1. The first webpage WP1 is searched for by the search section 505. Specifically, the ink color CL of the first specific area MK1 is red and the search section 505 accordingly searches the first search site ST1 for the first specific number NP1 of first webpages WP1. The first link image ML1 exhibits for example "https://bcde.co.jp/".

The second link image ML2 indicates second link information LNJ2 of a second webpage WP2. The second link image ML2 is attached to the second character string image MC2 as a reference by the attachment section 508. The second link image ML2 is located for example beneath the second character string image MC2. The second webpage WP2 includes information relating to a meaning of the second character string CP2. The second webpage WP2 is searched for by the search section 505. Specifically, the ink color CL of the second specific area MK2 is yellow and the search section 505 accordingly searches the second search site ST2 for the first specific number NP1 of second webpages WP2. The second link image ML2 exhibits for example "https://fghij.co.jp/.

The third link image ML3 indicates third link information LNJ3 of a third webpage WP3. The third link image MU is attached to the third character string image MC3 as a reference by the attachment section 508. The third link image ML3 is located for example beneath the third character string image MC3. The third webpage WP3 includes information relating to a meaning of the third character string CP3. The third webpage WP3 is searched for by the search section 505. Specifically, the ink color CL of the third specific area MK3 is red and the search section 505 accordingly searches the first search site ST1 for the first specific number NP1 of third webpages WP3. The third link image ML3 exhibits for example "https://klmnop.co.jp/".

The first link image ML1, the second link image ML2, and the third link image ML3 are each in a color readily distinguishable from the character string images MC. In a situation for example in which the character string images MC are black in color, the first link image ML1, the second link image ML2, and the third link image ML3 are indicated in blue.

As described with reference to FIGS. 2 to 4, the search section 505 searches the search site STA for the first specific number NP1 of the webpages WP in the embodiment of the present disclosure. The attachment section 508 attaches, as references, the first to third link image information MLJ1 to MLJ3 respectively to the first to third character string image information MCJ1 to MCJ3. Each of the first to third link image information MLJ1 to MLJ3 indicates link information of the first specific number NP1 of webpages WP, in a situation in which the user sets the first specific number NP1, link information of each of the first specific number NP1 of webpages WP, which the user desires, can be attached to the respective first to third character string images MC1 to MC3. Thus, user convenience can be further increased.

The link images ML are each in a color easily distinguishable from the character string images MC. Thus, the user can easily recognize that the link images ML are attached. Thus, user convenience can be further increased.

The attachment section 508 attaches, as references, the first to third link image information MLJ1 to MLJ3 respectively to the first to third character string image information MCJ1 to MCJ3 in the embodiment of the present disclosure, which should not be taken to limit the present disclosure. The attachment section 508 needs to attach, as references, the link information LNJ of respective webpages WP to the first to third character string image information MCJ1 to MCJ3. For example, the attachment section 508 may embed the first link information LNJ1 in the first character string image information MCJ1. The attachment section 508 may also embed for example the second link information LNJ2 in the second character string image information MCJ2. The attachment section 508 may for example embed the third link information LNJ3 in the third character string image information MCJ3.

The first specific number NP1 is 1 in the embodiment of the present disclosure, which should not be taken to limit the present disclosure. The first specific number NP1 may be 2 or larger. In a situation in which the first specific number NP1 is for example 2, the search section 505 searches for two webpages WP for each of the first to third character string images MC1 to MC3. The attachment section 508 then attaches as references two link images ML for example to each of the first to third character string images MC1 to MC3.

Figure 5:
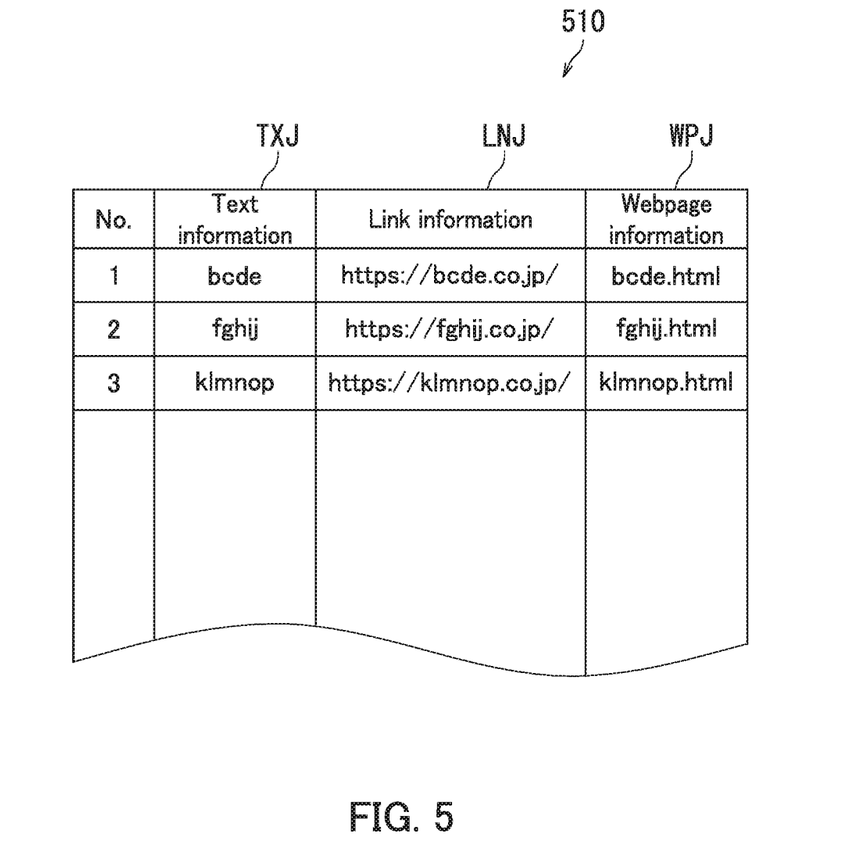
FIG. 5 is a diagram illustrating an example of information that file storage stores therein.

The following describes information stored in the file storage 510 illustrated in FIG. 2 with reference to FIGS. 2 to 5. FIG. 5 is a diagram illustrating an example of information that the file storage 510 stores therein. As illustrated in FIG. 5, the file storage 510 stores the text information TXJ, the link information LNJ, and the webpage information WPJ in association with one another. As described with reference to FIG. 2, the file storage 510 further stores the second image information MRJ2 therein.

The text information TXJ includes first text information TXJ1, second text information TXJ2, and third text information TXJ3.

The first text information TXJ1 indicates the first text TX1. Specifically, the first text information TXJ1 indicates a character string "bcde". The second text information TXJ2 indicates a second text TX2. Specifically, the second text information TXJ2 indicates a character string "fghij". The third text information TXJ3 indicates the third text TX3. Specifically, the third text information TXJ3 indicates a character string "klmnop".

The link information LNJ includes first link information LNJ1, second information LNJ2, and third link information LNJ3. The first link information LNJ1 is link information corresponding to a first webpage WP1. The first link information LNJ1 indicates for example "https://bcde.co.jp/". The second link information LNJ2 is link information corresponding to a second webpage WP2. The second link information LNJ2 indicates for example "https://fghij.co.jp/". The third link information LNJ3 is link information corresponding to a third webpage WP3. The third link information LNJ3 indicates for example "https://klmnop.co.jp/".

The webpage information WPJ includes first webpage information WPJ1, second webpage information WPJ2, and third webpage information WPJ3.

The first webpage information WPJ1 indicates the first webpage WP1. The first webpage information WPJ1 has a file name of for example "bcde.html". The first webpage information WPJ1 is downloaded through the server device 200 by the second acquisition section 507 illustrated in FIG. 2. The first webpage information WPJ1 is written into the file storage 510 in association with the first text information TXJ1 and the first link information LNJ1 by the writing section 509 illustrated in FIG. 2.

The second webpage information WPJ2 indicates the second webpage WP2. The second webpage information WPJ2 has a file name of for example "fghij.html". The second webpage information WPJ2 is downloaded through the server device 200 by the second acquisition section 507. The second webpage information WPJ2 is written into the file storage 510 in association with the second text information TXJ2 and the second link information LNJ2 by the writing section 509.

The third webpage information WPJ3 indicates the third webpage WP3. The third webpage information WPJ3 has a file name of for example "klmnop.html". The third webpage information WPJ3 is downloaded through the server device 200 by the second acquisition section 507. The third webpage information WPJ3 is written into the file storage 510 in association with the third text information TXJ3 and the third link information LNJ3 by the writing section 509.

As described with reference to FIGS. 2 to 5, the second acquisition section 507 downloads and acquires the webpage information WPJ in the embodiment of the present disclosure. The file storage 510 stores therein the webpage information WPJ in association with the second image information MRJ2. The attachment section 508 attaches the link information LNJ corresponding to the webpage information WPJ stored in the file storage 510 to the character string images MC083. Through the above, selection of a character string image MC with the link information LNJ attached thereto can cause display of the webpage WP even in a situation in which the image forming apparatus 100 is not connected to the Internet. Thus, user convenience can be further increased.

The first to third webpage information WPJ1 to WPJ3 are each in hypertext markup language (HTML) format in the embodiment of the present disclosure, which should not be taken to limit the present disclosure. The first to third webpage information WPJ1 to WPJ3 may be for example in PDF format.

Figure 6:
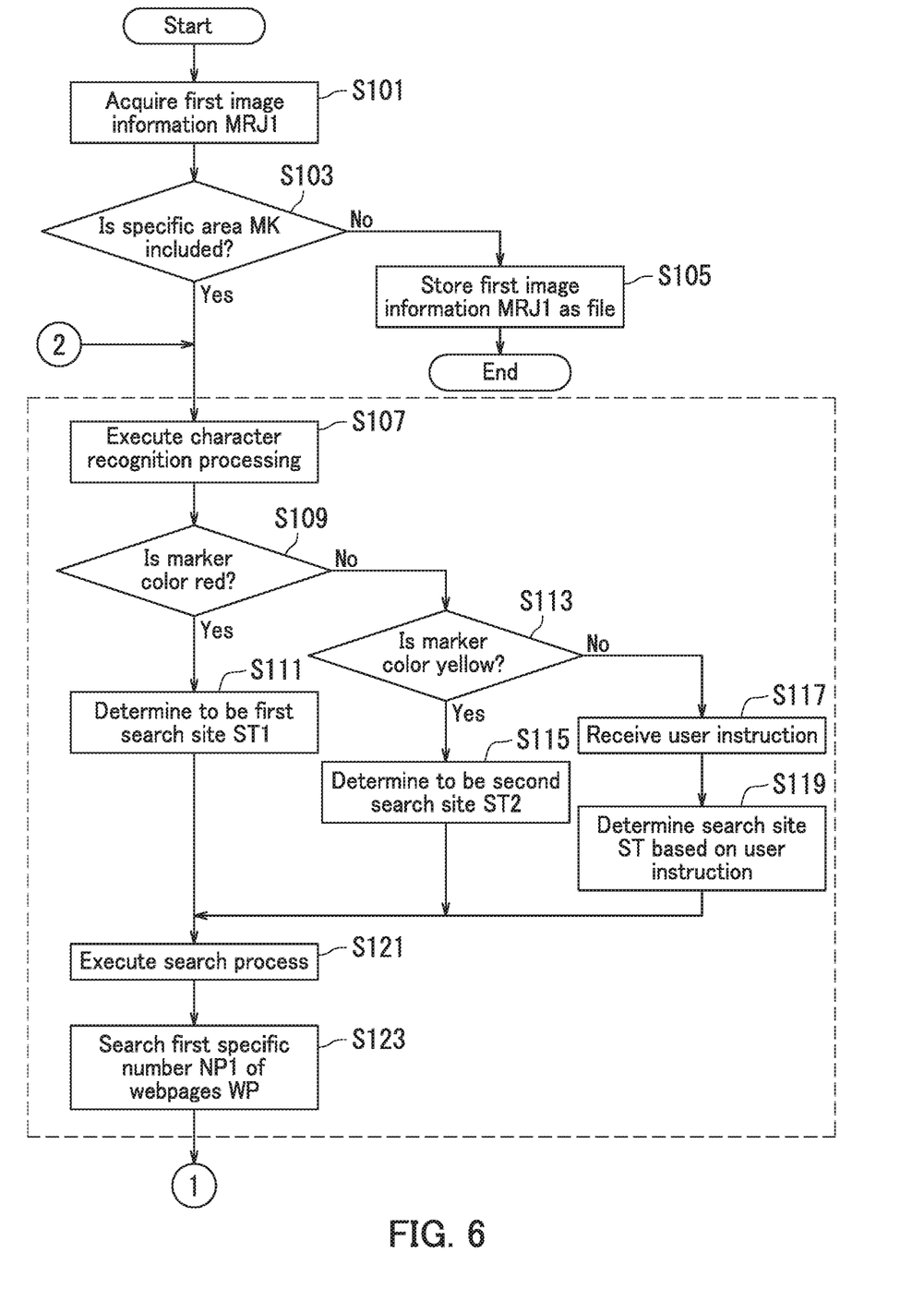
FIG. 6 is a flowchart depicting an example of a process performed by the controller.
Figure 7:
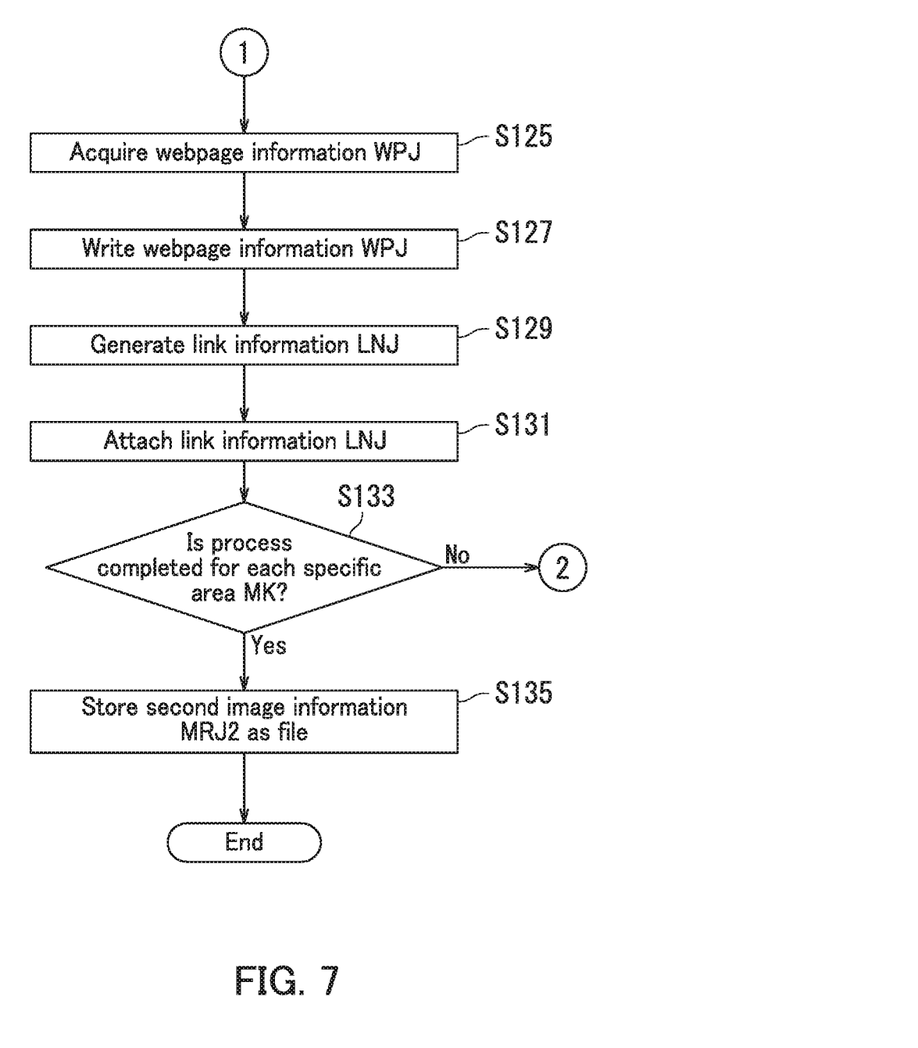
FIG. 7 is a flowchart depicting an example of a process performed by the controller.

The following describes a process performed by the controller 5 with reference to FIGS. 2 to 7. FIGS. 6 and 7 are flowcharts depicting an example of the process performed by the controller 5.

As illustrated in FIG. 6, the first acquisition section 501 acquires first image information MRJ1 from the image reading unit 2 first in Step S101. The first image information MRJ1 indicates a first image MR1 formed on a document R.

In Step S103, the extraction section 502 then determines whether or not the first image MR1 includes a specific area MK.

When the extraction section 502 determines that the first image MR1 includes no specific area MK (No in Step S103), the process proceeds to Step S105.

In step S105, the writing section 509 writes the first image information MRJ1 into the file storage 510 and the process ends.

When the extraction section 502 determines that the first image MR1 includes any specific area MK (Yes in Step S103), the process proceeds to Step S107.

In Step S107, the extraction section 502 extracts each specific area MK and the character recognition section 504 performs the character recognition processing on character string image information MCJ included in the specific area MK to generate text information TXJ corresponding to the character string image information MCJ.

In Step S109, the determination section 503 determines whether or not the ink color CL of the specific area MK is red.

When the determination section 503 determines that the ink color CL of the specific area MK is not red (No in Step S109), the process proceeds to Step S113. When the determination section 503 determines that the ink color CL of the specific area MK is red (Yes in Step S109), the process proceeds to Step S111.

In Step S111, the search section 505 determines the search site ST to be the first search site ST1 and the process proceeds to Step S121.

When a negative determination is made in Step S109, the determination section 503 determines whether or not the ink color CL of the specific area MK is yellow in Step S113.

When the determination section 503 determines that the ink color CL of the specific area MK is not yellow (No in Step S113), the process proceeds to Step S117. When the determination section 503 determines that the ink color CL of the specific area MK is yellow (Yes in Step S113), the process proceeds to Step S115.

In Step S115, the search section 505 determines the search site ST to be the second search site ST2 and the process proceeds to Step S121.

When a negative determination is made in Step S113, the controller 5 receives user instruction as to whether the search site ST is determined to be the first search site ST1 or the second search site ST2 in step S117.

Next, in step S119, the search section 505 determines the search site ST to be the first search site ST1 or the second search site ST2 according to the user instruction.

Next, in Step S121, the search section 505 executes search through the server device 200.

Next, in Step S123, the search section 505 selects the first specific number NP1 of webpages WP based on a result of the search. The search section 505 selects for example the first specific number NP1 of webpages WP among webpages found in the search in descending order from the top.

Next, in Step S125, the second acquisition section 507 downloads and acquires webpage information WPJ as depicted in FIG. 7. The webpage information WPJ indicates the first specific number NP1 of webpages WP.

Next, in Step S127, the writing section 509 writes the webpage information WPJ into the file storage 510.

Next, in step S129, the controller 5 generates link information LNJ corresponding to the webpage information WPJ.

Next, in Step S131, the attachment section 508 attaches as a reference the link information LNJ of the webpages WP to the character string image information MC1 included in the specific area MK.

Next, in Step S133, the controller 5 determines whether or not attachment of the link information LNJ for each specific area MK has been completed.

When the controller 5 determines that attachment of the link information LNJ for each specific area MK has not been completed yet (No in Step S133), the process returns to Step S107 in FIG. 6. When the controller 5 determines that attachment of the link information LNJ for each specific area MK has been completed (Yes in Step S133), the process proceeds to Step S135.

In step S135, the writing section 509 writes second image information MRJ2 as a file into the file storage 510 and the process ends. The second image information MRJ2 is image information with the link information LNJ of the webpages WP attached thereto. The link information LNJ is attached as a reference to the character string image information MCJ included in the specific area MK corresponding to the first image information MRJ1.

Note that Steps S109 to S123 in FIG. 6 are equivalent to an example of a "page determination process". The page determination process is a process by which the controller 5 determines the first specific number NP1 of webpages WP. The link information LNJ of the first specific number NP1 of webpages WP is attached, as a reference, to the character string image information MCJ included in the specific areas MK by the attachment section 508.

As described with reference to FIGS. 2 to 7, the determination section 503 determines an ink color CL of each specific area MK in the embodiment of the present disclosure. The search section 505 determines a single search site STA from among the search sites STN according to a result of determination by the determination section 503, and searches the single search site STA for webpages WP. The search sites STN include for example the first search site ST1 and the second search site ST2. Thus, the user can select a search site STA according to a marker color CL. Thus, user convenience can be further increased.

The specific areas MK each are an area on which a maker ink is painted in the embodiment of the present disclosure, which should not be taken to limit the present disclosure. It is only required that each specific area MK be an area with a specific mark. The specific mark may for example be an underline or a pair of double quotation marks. In a case Where the specific mark is an underline, the underline is drawn for example under the first character string image MC1. In a case where the specific mark is a pair of double quotation marks, the double quotation marks are inserted for example before and after the first character string image MC1.

Figure 8:
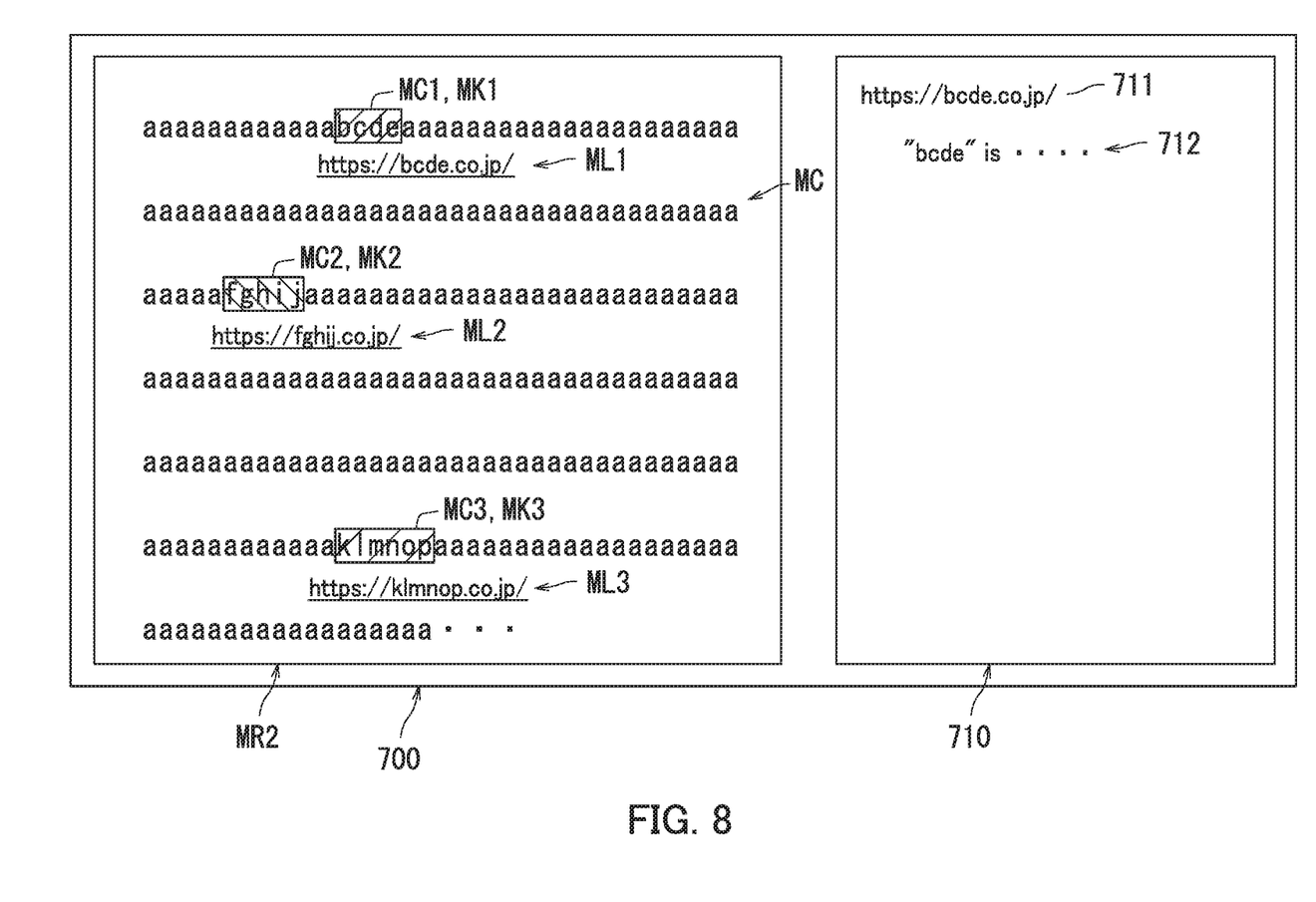
FIG. 8 is a screen diagram illustrating an example of a webpage display screen.

The following describes a situation in which the user uses the second image information MRJ2 with reference to FIGS. 1 to 5, 8, and 9. FIG. 8 is a screen diagram illustrating an example of a webpage display screen 700. The webpage display screen 700 is displayed on the touch panel 41 when the user uses the second image information MRJ2 generated by the attachment section 508.

As illustrated in FIG. 8, the webpage display screen 700 includes a second image MR2 and a webpage image 710. The second image MR2 illustrated in FIG. 8 is the same as the second image MR2 illustrated in FIG. 4, and therefore, description thereof is omitted.

The webpage image 710 is displayed for example upon the user touching the first link image ML1 in the second image MR2. The webpage image 710 is an image of the first webpage WP1. The webpage image 710 includes a first link image 711 and a main content image 712.

The first link image 711 is the same as the first link image ML1. That is, the first link image 711 exhibits for example "https://bcde.co.jp/".

The main content image 712 exhibits the content of the first webpage WP1. The main content image 712 exhibits for example "'bcde' is . . . ".

Figure 9:
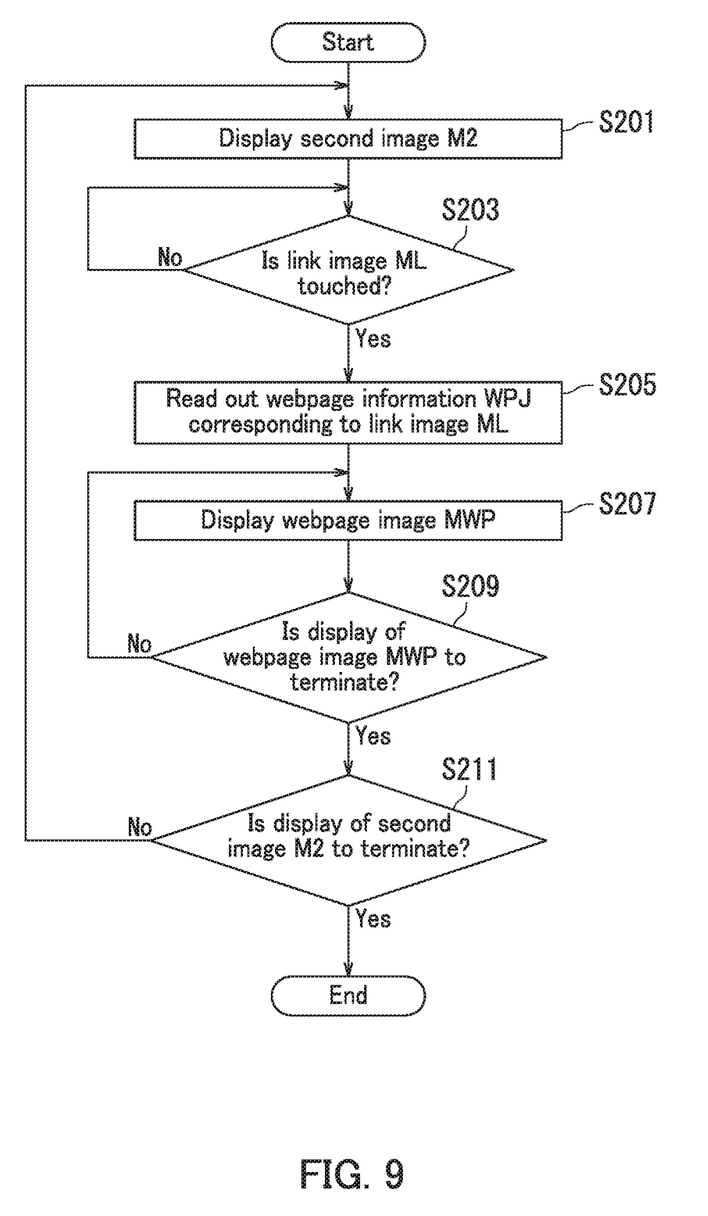
FIG. 9 is a flowchart depicting an example of a process performed by the controller in a situation in which the second image is used.

FIG. 9 is a flowchart depicting an example of a process performed by the controller 5 in a situation in which the second image MR2 is used.

In Step S201, first, the controller 5 causes the touch panel 41 to display the second image MR2.

In Step S203, the controller 5 then determines whether or not any of link images ML is touched. The link images ML include a first link image ML1, a second link image ML2, and a third link image ML3.

Next, in Step S205, the controller 5 reads out webpage information WPJ corresponding to a touched link image ML, from the file storage 510. The webpage information WPJ includes first webpage information WPJ1, second webpage information WPJ2, and third webpage information WPJ3.

Next, in Step S207, the controller 5 then causes the touch panel 41 to display a webpage image MWP corresponding to the webpage information WPJ. The webpage image MWP is an image of a webpage WP.

In Step S209, the controller 5 determines whether or not to terminate display of the webpage image MWP. Specifically, the controller 5 determines whether or not to terminate display of the webpage image MWP based on user operation.

When the controller 5 determines not to terminate display of the webpage image MWP (No in Step S209), the process returns to Step S207. When the controller 5 determines to terminate display of the webpage image MWP (Yes in Step S209), the process proceeds to Step S211.

In Step S211, the controller 5 determines whether or not to terminate display of the second image MR2. Specifically, the controller 5 determines whether or not to terminate display of the second image MR2 based on user operation.

When the controller 5 determines not to terminate display of the second image MR2 (No in Step S211), the process returns to Step S201. When the controller determines to terminate display of the second image MR2 (Yes in Step S211), the process ends.

As described with reference to FIGS. 1 to 5, 8, and 9, an image of the first webpage WP1 can be displayed on the touch panel 41 by the user touching the first link image ML1 in the second image MR2 in the embodiment of the present disclosure. Similarly, an image of the second webpage WP2 can be displayed on the touch panel 41 by the user touching the second link image ML2 in the second image MR2. Also, an image of the third webpage WP3 can be displayed on the touch panel 41 by the user touching the third link image ML3 in the third image MR3. In this manner, the user can easily cause display of the first to third webpages WP1 to WP3 including information relating to the respective meanings of the first to third texts TX1 to TX3. Thus, user convenience for search can be improved.

Figure 10:
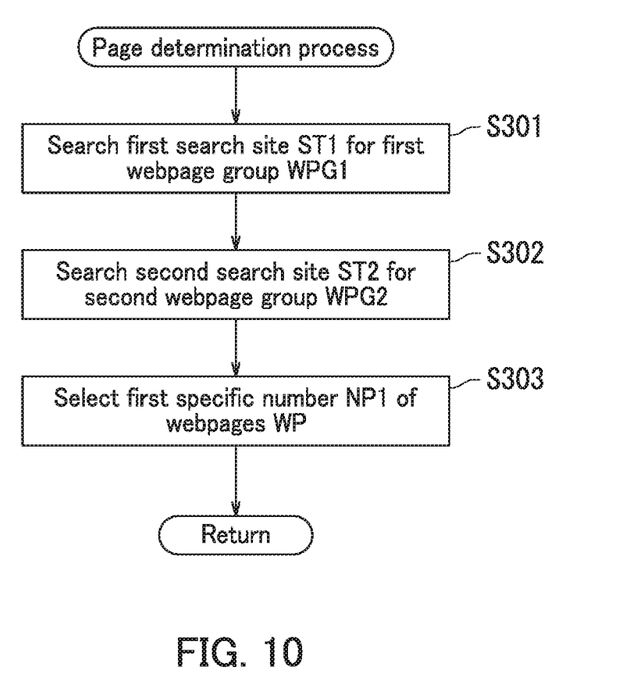
FIG. 10 is a flowchart depicting an example of a page determination process performed by the controller.

The following further describes the page determination process performed by the controller 5 with reference to FIGS. 2 to 7 and 10. FIG. 10 is a flowchart depicting an example of the page determination process performed by the controller 5.

As depicted in FIG. 10, the search section 505 searches the first search site ST1 for a first webpage group WPG1 first in Step S301. The first webpage group WPG1 includes a second specific number NP2 of webpages WP among webpages found in the search on the first search site ST1 in descending order from the top. The second specific number NP2 is larger than the first specific number NP1. The second specific number NP2 is 10, for example.

Subsequently, the search section 505 searches the second search site ST2 for a second webpage group WPG2 in Step 302. The second webpage group WPG2 includes the second specific number of webpages WP among webpages found in the search on the second search site ST2 in descending order from the top.

Next, the selection section 506 selects the first specific number of webpages WP in Step S303. Specifically, the selection section 506 selects the first specific number NP1 of webpages WP included in the first webpage group WPG1 and the second webpage group WPG2. The process then proceeds to Step S125 in FIG. 7.

As described with reference to FIGS. 2 to 7 and 10, the first specific number NP1 of webpages WP are selected that are included in the first webpage group WPG1 and the second webpage group WPG2 in the embodiment of the present disclosure. This can increase a possibility that a webpage WP that the user desires to browse is included in the first specific number NP1 of webpages WP. Thus, user convenience can be further increased.

The first specific number NP1 of webpages WP are selected that are included in the first webpage group WPG1 and the second webpage group WPG2 in the embodiment of the present disclosure, which should not be taken to limit the present disclosure. The selection section 506 only needs to select the first specific number NP1 of webpages WP based on a result of search in the first search site ST1 and a result of search in the second search site ST2, For example, the selection section 506 may select the first specific number NP1 of webpages WP from the first webpage group WPG1 and the second webpage group WPG2 based on user operation. In this configuration, link information LNJ of each of the first specific number NP1 of webpages WP that the user desires can be attached. Thus, user convenience can be further increased.

Figure 11:
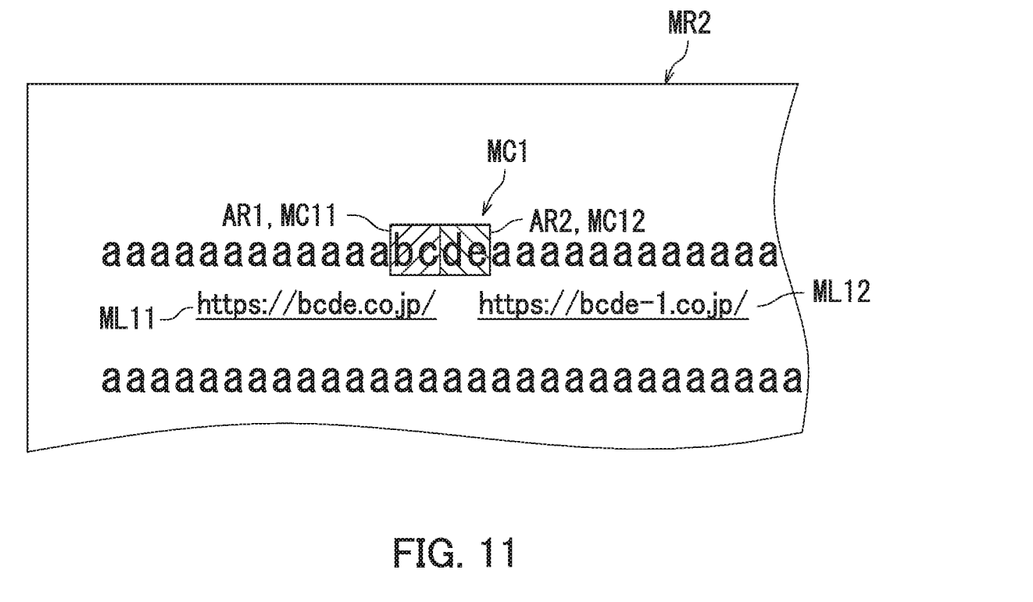
FIG. 11 is a diagram illustrating an example of the second image.

The following describes the second image MR2 with reference to FIGS. 2 to 7 and 11. FIG. 11 is a diagram illustrating an example of the second image MR2. The second image MR2 illustrated in FIG. 11 differs from the second image MR2 illustrated in FIG. 4 in that first link image information MLJ11 and first link image information MLJ12 are attached to first character string image information MCJ1 included in a first specific area MK1. In the following description, the difference from the second image MR2 illustrated in FIG. 4 will be mainly discussed.

The first specific area MK1 is divided into a first area AR1 and a second area AR2. The first area AR1 is an area located left in the first specific area MK1. The second area AR2 is an area located right in the first specific area MK1. The first character string image MC1 is divided into a first character string image MC11 and a first character string image MC12. Specifically, the first character string image MC1 exhibits a character string "bcde". The first character string image MC11 exhibits a character string "bc". The first character string image MC12 exhibits a character string "de". The first character string image information MCJ11 indicates the first character string image MC11 and is equivalent to a "part of information of a character string image". The first character string image information MCJ12 indicates the first character string image MC12 and is equivalent to "another part of the information of the character string image".

A first link image ML11 indicates link information LNJ of a webpage WP11 found in the first search site ST1. The first link image ML11 is attached to the first character string image MC11 as a reference by the attachment section 508. Specifically, the first link image ML11 is located beneath the first character string image MC11 by the attachment section 508. The first link image information MLJ11 indicates the first link image ML11.

A first link image ML12 indicates link information LNJ of a webpage WP12 searched for in the second search site ST2. The first link image ML12 is attached to the first character string image MC12 as a reference by the attachment section 508. Specifically, the first link image ML12 is located beneath the first character string image MC12 by the attachment section 508. The first link image information MLJ12 indicates the first link image ML12.

When the user touches the first link image ML11, the controller 5 causes display of an image of a webpage WP searched for in the first search site ST1. When the user touches the first link image ML12, the controller 5 causes display of an image of a webpage WP searched for in the second search site ST2.

As described with reference to FIGS. 2 to 7 and 11, the attachment section 508 attaches the first link image information MLJ11, as a reference, to the first character string image information MCJ11 and attaches the first link image information MLJ12, as a reference, to the first character string image information MCJ12 in the embodiment of the present disclosure. In the above configuration, the user can recognize a result of search on the first search site ST1 and a result of search on the second search site ST2. Thus, user convenience can be further increased.

An embodiment of the present disclosure has been described so far with reference to the accompanying drawings. However, the present disclosure is not limited to the above embodiment and may be implemented in various different forms that do not deviate from the essence of the present disclosure (for example, as described below in sections (1) to (3)). The drawings schematically illustrate elements of configuration in order to facilitate understanding. Properties of the elements of configuration illustrated in the drawings, such as thickness, length, and quantity, may differ from reality in order to aid preparation of the drawings. Furthermore, properties of the elements of configuration described in the above embodiment, such as shapes and dimensions, are merely examples and are not intended as specific limitations. Various alterations may be made so long as there is no substantial deviation from the configuration of the present disclosure.

(1) As described with reference to FIG. 1, the "electronic device" is the image forming apparatus 100 in the embodiment of the present disclosure, which should not be taken to limit the present disclosure. The electronic device only needs to be capable of being connected to the Internet and include the image reading unit 2 and the controller 5. The electronic device may for example be a smartphone. In the above case, a camera of the smartphone corresponds to the image reading unit 2.

(2) As described with reference to FIG. 1, the image forming apparatus 100 is a multifunction peripheral in the embodiment of the present disclosure, which should not be taken to limit the present disclosure. The image forming apparatus 100 only needs to include the image reading unit 2 and the controller 5. The image forming apparatus 100 may be a scanner, for example.

(3) As described with reference to FIGS. 1 to 3, the server device 200 performs the search process, which should not be taken to limit the present disclosure. The image forming apparatus 100 may perform the search process. In the above configuration, the image forming apparatus 100 is capable of being connected to the Internet.

What is claimed is:
1. An electronic device comprising:
   a reading section configured to read an image formed on a document to generate first image information;
   an extraction section configured to extract a specific area from the image based on the first image information;
   a recognition section configured to execute character recognition processing on information of a character string image included in the specific area to generate text information corresponding to the information of the character string image;
   a search section configured to search for a webpage containing information relating to a meaning of a text indicated by the text information;
   an attachment section configured to attach link information of the webpage to the information of the character string image to generate second image information; and
   storage configured to store the second image information therein, wherein
   the specific area is an area with a specific mark applied thereto,
   the electronic device further comprises a selection section configured to select a first specific number of webpages,
   the search section searches a first search site for the webpages and searches a second search site for the webpages, the second search site differing from the first search site,
   the selection section selects the first specific number of webpages based on a result of search on the first search site and a result of search on the second search site, the attachment section attaches, as a reference, link information of each of the first specific number of webpages to the information of the character string image, the selection section selects the first specific number of webpages based on a second specific number of webpages among webpages found in the search on the first search site in descending order from a top and the second specific number of webpages among webpages found in the search on the second search site in descending order from a top, the second specific number is larger than the first specific number, and the first specific number of webpages is included in the second specific number of webpages among webpages found in the search on the first search site in the descending order from the top and the second specific number of webpages among webpages found in the search on the second search site in the descending order from the top.

2. The electronic device according to claim 1, wherein the specific mark is a mark with a marker ink applied thereto or a color image formed by an electronic marker, and the specific area is an area with the marker ink applied thereto or an area of the color image formed by the electronic marker.

3. The electronic device according to claim 2, further comprising a determination section configured to determine a color of the marker ink or the color image in the specific area, wherein the search section searches for the webpage according to a result of determination by the determination section.

4. The electronic device according to claim 3, wherein the search section determines a single search site from among a plurality of search sites according to a result of determination by the determination section, and searches the single search site for the webpage.

5. The electronic device according to claim 1, wherein the search section searches for the first specific number of webpages, and the attachment section attaches, as a reference, link information for each of the first specific number of webpages to the information of the character string image.

6. An electronic device comprising:

a reading section configured to read an image formed on a document to generate first image information;

an extraction section configured to extract a specific area from the image based on the first image information;

a recognition section configured to execute character recognition processing on information of a character string image included in the specific area to generate text information corresponding to the information of the character string image;

a search section configured to search for a webpage containing information relating to a meaning of a text indicated by the text information;

an attachment section configured to attach link information of the webpage to the information of the character string image to generate second image information; and storage configured to store the second image information therein, wherein the specific area is an area with a specific mark applied thereto, the electronic device further comprises a selection section configured to select a first specific number of webpages, the search section searches a first search site for the webpages and searches a second search site for the webpages, the second search site differing from the first search site, the selection section selects the first specific number of webpages based on a result of search on the first search site and a result of search on the second search site, the attachment section attaches, as a reference, link information of each of the first specific number of webpages to the information of the character string image, the selection section selects a first webpage group and a second webpage group, the first webpage group includes the first specific number of webpages among webpages found in the search on the first search site in descending order a top, the second webpage group includes the first specific number of webpages among webpages found in the search on the second search site in descending order from a top, and the attachment section attaches, as a reference, link information of the first webpage group to a part of the information of the character string image and attaches, as a reference, link information of the second webpage group to another part of the information of the character string image.

7. The electronic device according to claim 1, wherein the image includes a handwritten character string image.

8. The electronic device according to claim 1, further comprising an acquisition section configured to acquire webpage information indicating the webpage, the storage stores therein the webpage information in association with the second image information, and the attachment section attaches, as a reference, link information of the webpage information stored in the storage to the information of the character string image.

* * * * *